Aug. 25, 1936.   T. B. TYLER   2,052,429
CLUTCH
Filed June 1, 1932   4 Sheets-Sheet 2

INVENTOR
Tracy Brooks Tyler
BY
ATTORNEYS

Aug. 25, 1936.  T. B. TYLER  2,052,429
CLUTCH
Filed June 1, 1932    4 Sheets-Sheet 3
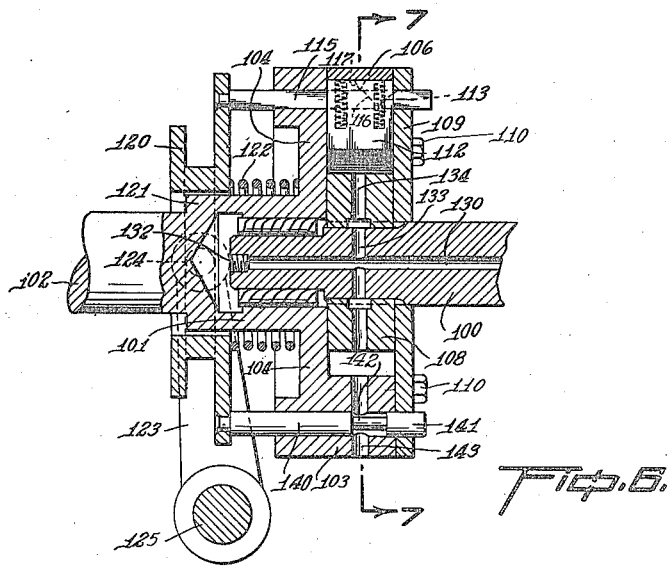
INVENTOR
Tracy Brooks Tyler
BY
ATTORNEYS Aug. 25, 1936.   T. B. TYLER   2,052,429
CLUTCH
Filed June 1, 1932   4 Sheets-Sheet 4
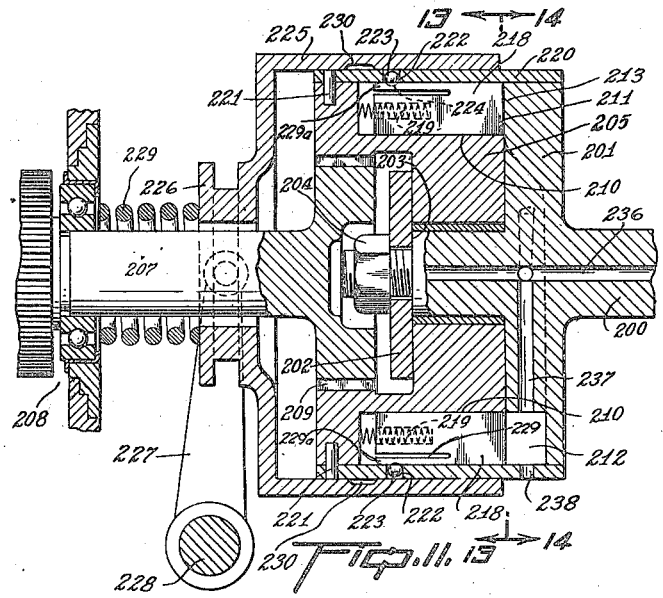
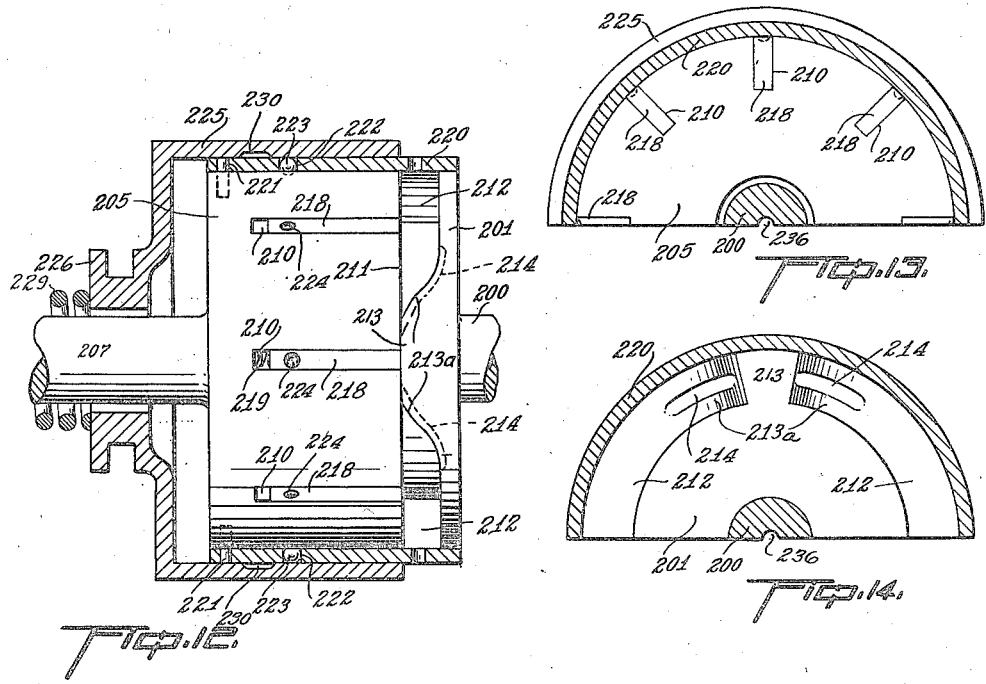
INVENTOR
Tracy Brooks Tyler
BY
ATTORNEYS Patented Aug. 25, 1936

2,052,429

UNITED STATES PATENT OFFICE 2,052,429

CLUTCH

Tracy Brooks Tyler, Detroit, Mich., assignor to The Monopower Corporation, Detroit, Mich., a corporation of Michigan Application June 1, 1932, Serial No. 614,745

2 Claims. (Cl. 192—58)

This invention relates to clutches, particularly to fluid clutches. The principal objects of the invention are to provide novel forms of clutches adapted for use with automotive vehicles, industrial machinery, etc.

Still further objects of the invention will become apparent upon reference to the following detailed description of embodiments of the invention and to the appended drawings, in which Figure 1 shows in conjunction, a novel fluid clutch and a novel fluid pump, in lonigtudinal vertical section;

Fig. 6 is a longitudinal vertical sectional view of another novel fluid clutch;

Fig. 7 is a section as if on line 7—7, Fig. 6, the clutch parts being shown in non-driving relation;

Fig. 8 is fragmentary transverse section showing clutch parts in driving relation;

Fig. 9 shows part of a vane actuator rod, in perspective;

Fig. 10 shows part of a vane or interceptor, in perspective;

Fig. 11 is a longitudinal vertical section of still another novel fluid clutch;

Fig. 12 is a similar view but with parts shown in elevation; and

Figs. 13 and 14 are fragmentary section views as if in the direction of the arrows 13—13, and 14—14 of Fig. 12.

Figure 1:
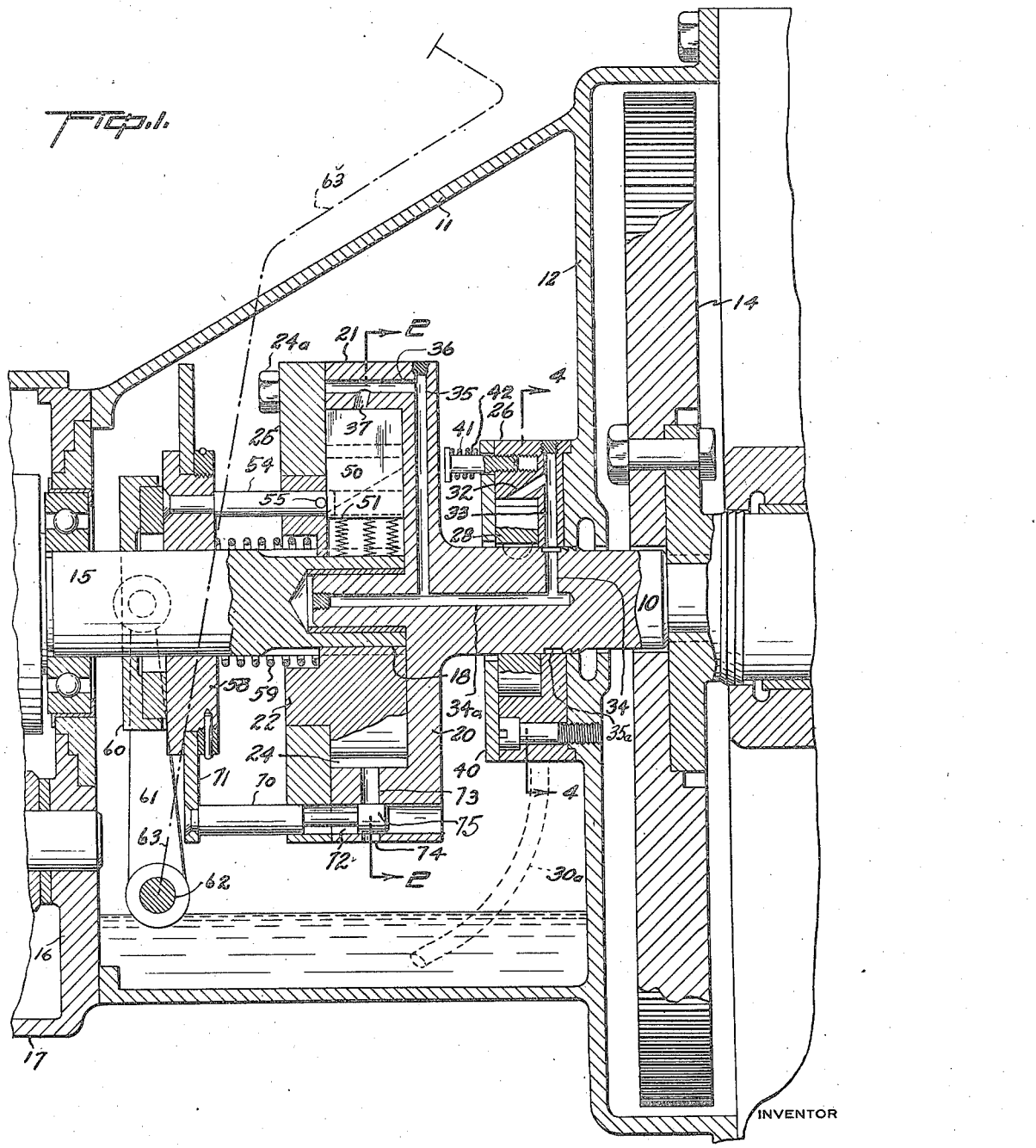
Figure 2:
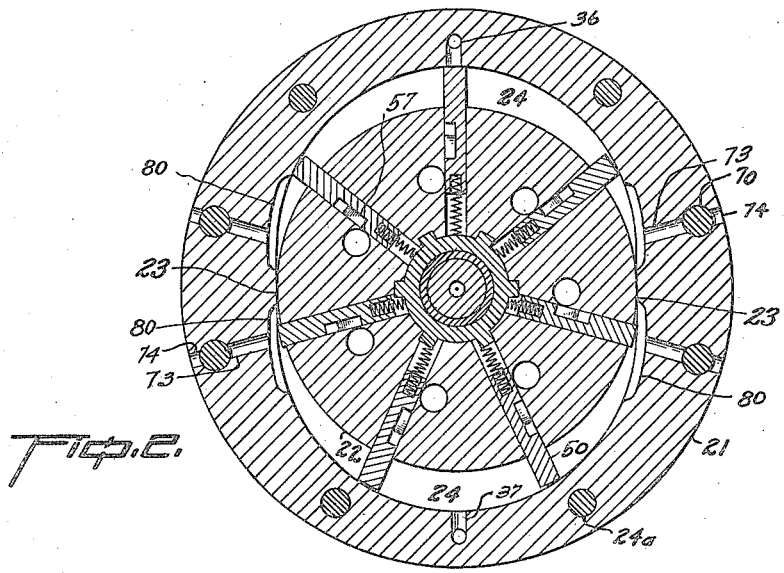
Fig. 2 is a transverse section as if on line 2—2 of Fig. 1, the clutch parts being shown in driving relation.
Figure 3:
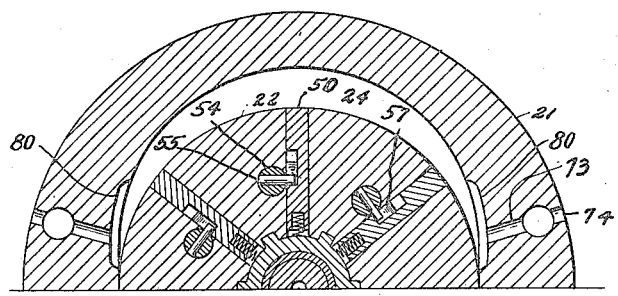
Fig. 3 is a fragmentary transverse section showing clutch parts in non-driving relation.
Figure 5:
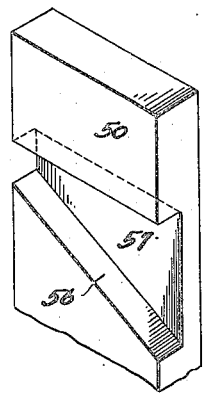
Fig. 5 is a fragmentary perspective view of a driving vane or intercepter.
Figure 4:
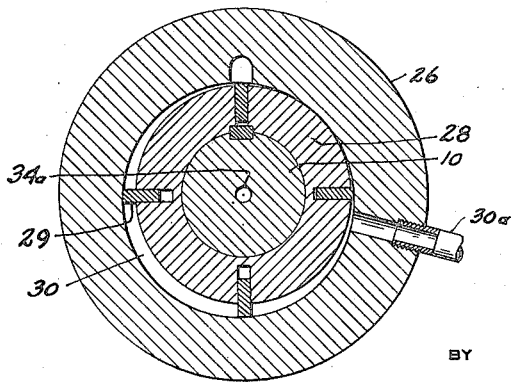
Fig. 4 is a section of the novel pump as if on line 4—4 of Fig. 1.

Referring to the drawings, and more particularly to Figs. 1-5, it will be seen that the clutch shown in these figures includes a driving shaft 10 projecting into the clutch housing 11 through a transverse wall 12, the shaft being coupled to the engine crank shaft in a suitable manner and having a fly wheel 14 on the engine side of the wall 12. Through a clutch proper, whose parts are to be described, the driving shaft 10 is adapted to be connected for driving to the transmission drive shaft 15, the latter projecting through a transverse wall 16 of the transmission casing 17, this wall, however, since it forms an end plate for the clutch housing 11, being regarded as a clutch housing wall. The aperture in the clutch housing walls through which shafts 10 and 15 project may be suitably sealed against leakage of fluid from the partially filled interior of the clutch housing, the fluid serving as the driving medium and also serving to lubricate the journals and bearings, and other parts within the clutch housing. The shafts 10 and 15 are journaled in each other, as shown at 18.

Preferably, though not necessarily, integral with one of the shafts, namely the shaft 10, is a web 20 having a thick walled casing or shell 21, which in the embodiment shown forms the driving parts of the clutch. Splined on the end of the other shaft, namely the driven shaft 15, is a rotor 22, disposed in the shell 21 and abutting the web 20. The rotor may be and is shown as truly circular in cross section, and the cross sectional space in the shell is shown as oval, providing sealing faces at 23. Sealed spaces or pockets 24 are thus provided between the rotor and the shell, these being constantly supplied with driving fluid by a low and constant pressure pump whose construction will now be described.

The casing further has bolted thereto, by bolts 24a, a retaining plate 25 which retains the rotor in the casing.

The novel pump includes a stationary casing 26 secured to the wall 12 and containing a rotor 28 keyed to the shaft 10, the rotor having sliding vanes 29, which slide and rotate in the eccentric chamber 30 within the shell 26 as the rotor rotates. A conduit 30a having its lower end in the body of fluid which partially fills the clutch casing and having its upper end opening into the pump chamber 30 forms the inlet for the pump. The outlet of the pump includes a passage or bore 32 connecting the chamber 30 with a radial passage 33 in the casing 26, this last mentioned passage being adapted to be registered with the radial bore 34 formed in the drive shaft 10 by means of an annular groove 35a therein. An axial bore 34a in the shaft 10 connects bore 34 with a radial passage 35 in the web 20, and passage 35 is connected to the spaces 24 in the shell through a longitudinal passage 36 and a radial port 37, substantially as shown. The pump has an end plate 40 which is held thereon by compression springs 41 surrounding the stationary pins 42 threaded into the stationary pump casing 26, the end plate being movable, under fluid pressure in the pump, and against the influence of the springs 41, and thus serving as a means to prevent too great a pressure being built up within the pump, by allowing all excess fluid to escape, in any volume, by opening the whole side of the pump casing.

Mounted to slide in radial grooves in the rotor 22 are a plurality of driving vanes or interceptors 50 which are adapted to be projected into the spaces 24 by coiled compression springs 51. The driving vanes when projected, as in Fig. 2, serve to create a driving connection between the rotor and the shell through the medium of the fluid in the sealed spaces 24. The vanes may be retracted, against the influence of the springs 51 by a plurality of slidable actuators 54 passing through the rotor 22 and having pins 55 adapted to engage the sloping surfaces 56 forming one side of the slots 57 of the vanes. It will be seen that when the actuators 54 are advanced by means to be described, towards the right (Fig. 1) they cause the vanes to be retracted. Conversely, when the actuators are retracted towards the left, Fig. 1, they permit the vanes to be projected.

The means for operating the actuators 54 includes a collar 58 surrounding and loosely mounted on the driven shaft 15, the collar being constantly biased toward the left by a compression spring 59, surrounding shaft 15 and disposed between the rotor 22 and the collar 58. The collar 58 may be moved against the influence of the spring by a ring 60 connected to and operated by a yoke 61, the latter being fixed to a transverse shaft 62 which in turn is externally connected to a clutch actuator, indicated diagrammatically as a clutch actuating pedal 63. It will be observed that when the operator depresses pedal 63 the actuator collar 58 will be advanced and the vanes will be retracted. Conversely when pedal 63 is released by the operator, spring 59 will move the actuator parts towards the left permitting the vanes to be moved outwardly.

In order to control the clutch, there are provided plungers 70 connected to the actuator collar 58 by a ring 71. These plungers have annular grooves 72 which, when registered with aligned ports 73 and 74 formed in the shell, vent the fluid therein. The heads 75 of the plungers, when registered with the ports 73—74, prevent such venting and seal the fluid in the clutch.

The operation of the clutch will now be described:

When pedal 63 is depressed, plungers 70 are advanced and the fluid in the shell is vented, after which the vanes are readily retractable. When pedal 63 is permitted to return, the vanes are first freed to advance, and then the plunger heads 75 will close ports 73—74 to establish a driving seal, this being accomplished smoothly and gradually.

It will be observed that the driving connection is primarily controlled by the movement of the plungers 70, but it may be considered that the movement of the vanes also controls the connection.

In order to prevent too great a fluid pressure from being built up near the seals 23 of the sealed spaces 24 when the clutch is engaged, reliefs 80 near the sealing portions 23 are provided, these reliefs serving to by-pass the vanes as they approach the sealing portions and relieving the increased pressure that would otherwise be built up at these points in the spaces.

The construction disclosed since it locks the fluid between the seals 23 for clutch connection prevents the driving fluid from flowing when the parts are in driving relation and thus prevents emulsification and heating of the fluid, this being also true when the vanes are retracted, as will be brought out later.

It will be observed that since the clutch actuating spring 59 is used only to return the clutch parts to engaged position, and does not operate to maintain them in engagement, as is the case with many types of clutches, the spring 59 need not be as heavy or strong as would otherwise be the case, and may well be no more than a relatively light spring. Accordingly, the pressure required to release this clutch is not so great as that required for other pressure clutches of similar capacity.

It will also be observed that the sequence of engagement operation permits the clutch to be controlled ultimately by the large ports 73—74 and the heads of plungers 70. Since the heads close the ports gradually, clutch engagement will be established smoothly and gradually.

Further, while the interceptors or vanes, in a sense, control clutch action, they do not, in the preferred mode of operation exercise the ultimate control over clutch action that is exercised by the plungers. For this reason, the projection and retraction of the vanes need not be controlled.

Further the reliefs or ports 73—74 are, as shown, close to the seals 23 so that complete relief of the fluid in the pockets of the clutches may be effected. The reliefs are on both sides of both seals, so that the action is not affected by the relative direction of rotation between the shell and rotor. The reliefs 80 are near the seals 23 of sealed spaces 24, these being the points of greatest pressure in the clutch.

Further, the vanes are held retracted, during clutch disengagement, so as not to cause churning, emulsification or heating of the fluid flowing through the clutch from inlet 36 to outlet 73, and so as not to rattle or wear, during clutch disengagement. This action, as observed, is of material importance in rendering the clutch more silent and more efficient, than other types of clutches, particularly fluid clutches, wherein churning of the fluid causes heating and emulsification thereof, at some time.

Further, the vanes 50 and sealing points 23 are so spaced about the rotor that both of the sealing points 23 can be acted upon by the vanes for driving at all times.

Further, if we regard two of the vanes, at any one time, as working vanes, it will be seen that these are not in the same position relative to their sealing points at any one time. Accordingly, the increased pressure being created by one vane on the fluid between it and its sealing point is compensated for by the compensating area exposed to the other of the two working vanes.

Further, the inlets 36 open into the no-pressure part of sealed spaces 24, whereas the reliefs or outlets 73 connect with the sealed spaces at their highest pressure parts.

Further the centrifugal forces on the vanes tend to enhance the desirable seal between their ends and the casing wall.

Further the clutch is so constructed that there is no tendency towards axial separation of the shafts 10 and 15.

Referring to the pump, it will be observed that the entire side wall 40 thereof, is moved, on the arising of excess pressure therein, to relieve the pump and that due to the area of the plate 40, the relief is unrestricted and instantaneous, regardless of the volume of fluid to be discharged for relief.

In Figures 6 to 10 there is disclosed a clutch wherein the fluid from the pump is delivered to the clutch, outwardly from the center, rather than inwardly from the periphery thereof, the clutch further having novel means for actuating the vanes or interceptors, these being in the casing rather than in the rotor, and projected inwardly for driving relation rather than outwardly.

Referring to these figures, it will be seen that the clutch includes a driving shaft 100 whose end is received within the cupped end 101 of a driven shaft 102, the shafts being thus journaled on each other. Formed integral with the driven shaft is a casing 103 having a web 104 and also having a plurality of radial slots 105 in its annular portion, these being capped by plates 106 secured to the web by screws 107. A rotor 108, splined to the driving shaft 100, is retained in the casing by an end plate 109, secured to the shell or casing by bolts 110 passing therethrough parallel to the axis of the shafts.

In the radial slots 105 are freely slidable radial vanes or interceptors 112, urged inwardly by coiled compression springs 113, disposed in bores 114 of the vanes and abutting the caps 106. The vanes may be held from being projected by the springs, by rods 115 slidable through the shell and the plate 109 and adjacent the slots 105. These rods have V-shaped notches 116 adapted to cooperate with the V-shaped lugs 117 of the vanes. It will be observed that when the notches 116 are in line with the lugs 117 the vanes may be projected inwardly by the springs 113. When the rods are moved from such positions, the sloping portions of notches 116 will act on lugs 117, whereupon rods 115 will retain vanes 112 retracted, with the lugs resting upon the upper surface of the rods.

For reciprocating the rods there are provided means including a grooved collar 120 to which the ends of the rods are secured, the collar being slidable over an enlarged portion 121 of the shaft against the influence of a clutch spring 122 by a clutch throwout fork 123, yoked thereto as indicated at 124, the fork being connected to a cross shaft 125 which may be actuated in any desired manner.

Axially of the shaft 100 is a conduit 130 leading from a suitable low pressure pump preferably of the construction shown for the pump of Figs. 1 to 5. The conduit 130 is closed at its inner end by a plug 132, and is provided with radial ports 133 passing through the shaft and into registry with radial ports 134 of the rotor 108. These ports in turn discharge into the large part of the crescent-shaped spaces 135 provided between the casing or shell 103 and the elliptical rotor 108, the spaces being sealed by the sealing portions 136 of the rotor, as indicated in Fig. 7.

It will be observed that the rotor 108 is provided with reliefs 137 adjacent the sealing portions 136 which reliefs prevent excessive pressure being built up near the seals of the crescent shaped sealing spaces or pockets 135, when clutch engagement is effected or being effected.

For controlling the clutch there are provided plungers 140 also secured to the clutch throwout collar 120 and having heads 141 and grooves 142 adapted selectively to control the communication between the aligned portions of the ports 143 of the casing, the plungers operating like those of the clutch of Figs. 1 to 5.

The operation of the clutch of Figs. 6 to 10 will readily be understood and need not be specifically mentioned at this time. It will, however, be observed that the clutch of Figs. 6 to 10 possesses many of the advantages inherent to the clutch of Figs. 1 to 5.

The clutch of Figs. 11 to 14 differs essentially from those previously described in that the vanes or interceptors are arranged to move axially, rather than radially. Because the vanes move axially the clutch of Figs. 11 to 14 may be made more compact and of smaller diameter than those previously described.

This form of clutch includes a driving shaft 200 formed with an enlargement or flange 201 between which, and a plate 202 secured against a shoulder 203 of the shaft by a nut 204, is a rotor 205 adapted to run freely on the shaft 200. Adjacent the end of the driving shaft 200 is a driven shaft 207 journaled as shown in an independent bearing 208 and free of shaft 200, though it may be piloted thereon through splines 209 in the rotor, all other parts of the shaft 200 being otherwise free of the shaft 201.

The rotor 205 is provided with a series of axial slots 210 spaced about the periphery thereof, and opening to the periphery and to the side or face wall 211 of the rotor, between which side wall and the flange 201 are actuate spaces 212, formed by recesses cut out of flange 201. These spaces are sealed by the sealing portions 213 remaining on the flange 201, these portions abutting and engaging the side 211 of the rotor and also being provided with excess pressure reliefs 214. Disposed within the slots 210 are axially slidable vanes 218 adapted to be forced into the spaces 212 by compression springs 219 abutting the rotor 205.

Enclosing the vanes, the rotor and the flange 201 is a casing or shell 220 secured to the rotor by pins 221 so as to be non-rotatable with respect thereto. This casing is provided with an annular row of holes 222 in which are disposed balls 223 adapted to mate with recesses 224 in the outer surfaces of the vanes 218.

For controlling the clutch there is provided a control sleeve 225 formed integral with the clutch throw-out collar 226 connected to the yoked end of a clutch fork 227 mounted upon a shaft 228 in the conventional manner. A spring 229 opposes disengagement movement of the parts. The sleeve 225 is provided with an annular internal groove 230 adapted to form a relief for balls 223 which control the clutch vanes.

For supplying fluid to the spaces 212 the shaft 200 is provided with an axial conduit 236 into which fluid is supplied by a suitable low pressure pump, and the conduit opens into the sealed spaces through a series of radial ports 237. For venting or relieving the spaces 212 of fluid there are provided a plurality of ports 238 in the casing 220.

The operation of this form of clutch will now be described.

The parts as shown are in non-clutching position, fluid from the spaces being vented through ports 238, and the vanes being held retracted by the balls 223 pressed inwardly into the recesses 224 by the inner surface of the control sleeve 225. It is observed at this time that the vanes are provided with slots 229 forming resilient tongues 229a at their inner ends.

When a clutch engagement is to be established, the control sleeve is moved to the right by the spring 229, on release of the clutch throw-out fork, until groove 230 aligns with balls 223, whereupon these balls move outwardly, releasing the vanes 218 and permitting them to be advanced into the spaces 212, then unsealed, by the springs 219. Further movement of the control sleeve 225 gradually closes the ports 238 and gradually seals the spaces 212 so that the fluid therein is rendered immobile. The vanes or interceptors, projecting into these fluid filled spaces, effect a clutch action through the medium of the fluid in these spaces.

When clutch engagement is to be destroyed the control sleeve 225 is moved to the left by fork 227, first relieving the spaces 212 almost instantaneously, through the uncovering of the ports 238. When the spaces are thus relieved, the flange 201 will move with respect to the rotor 205 and the camming portions 213a of the seals 213 will engage the ends of the projected vanes to force these vanes back into the slots 210. By this time, control sleeve 225 is moved far enough to the left to move the groove 230 away from the balls 223 and these latter are then projected into the path of the vanes 218, so that the vanes, when retracted by the camming portions 213a, will be locked back in the slots 210 by the balls seating in the recesses 224, of the spring tongues 229a.

The clutch of Figs. 11 to 14 possesses many of the advantages of the clutch previously described and further possesses important advantages inherent to it alone. It will be observed that clutch engagement does not tend to separate or create endwise separating thrust between the driving and driven shafts. This is true because of the fact that all of the clutch parts are mounted on one of the shafts and the only connections between the parts and the other shaft is in the spline at 209.

What I claim is:

1. A clutch for connecting driving and driven members, said clutch comprising a casing connected to one of said members, a rotor connected to the other of said members, a fluid medium for the space between said rotor and casing, means for introducing the fluid medium into the space, vanes adapted to be projected into and retracted from said fluid, said vanes being formed with inclined portions, longitudinally movable actuators adapted to engage said inclined portions to retract said vanes, said casing having a plurality of ports for exhausting said fluid, and means connected to said actuators and adapted to open said ports when said vanes are retracted.

2. A clutch for connecting driving and driven members, said clutch comprising a casing connected to one of said members, a rotor connected to the other of said members, a fluid medium for the space between said rotor and casing, means for introducing the fluid medium into the space, vanes adapted to be projected into and retracted from said fluid, movable actuators coperating means on said vanes and actuators whereby movement of said actuators retract said vanes, said casing having a plurality of exhaust ports, and means connected to said actuators and adapted to open said ports when said vanes are retracted.

TRACY BROOKS TYLER.